United States Patent [19]

Lokhoff

[11] Patent Number: 5,721,647
[45] Date of Patent: Feb. 24, 1998

[54] MULTITRACK RECORDING ARRANGEMENT IN WHICH TAPE FRAMES FORMED OF LATERALLY ADJACENT TRACK FRAMES ARE DISTRIBUTED AMONG RECORDING CHANNELS

[75] Inventor: Gerardus C.P. Lokhoff, Eindhoven, Netherlands

[73] Assignee: U.S. Philips Corporation, New York, N.Y.

[21] Appl. No.: 569,527

[22] Filed: Dec. 8, 1995

[30] Foreign Application Priority Data

Dec. 9, 1994 [EP] European Pat. Off. ............ 94203581

[51] Int. Cl.$^6$ ................................. G11B 5/02; G11B 5/09
[52] U.S. Cl. ............................. 360/822; 360/23; 360/48; 360/50
[58] Field of Search ........................... 360/22, 23, 48, 360/50, 8, 49, 72.2

[56] References Cited

U.S. PATENT DOCUMENTS

| | | | |
|---|---|---|---|
| 3,975,764 | 8/1976 | Kobayashi et al. | 360/23 |
| 4,422,111 | 12/1983 | Moeller et al. | 360/72.2 |
| 4,620,311 | 10/1986 | Immink | 375/19 |
| 4,646,170 | 2/1987 | Kobayashi | 360/22 |
| 5,130,863 | 7/1992 | Yamashita | 360/48 |
| 5,267,098 | 11/1993 | Lokhoff | 360/50 |
| 5,293,280 | 3/1994 | Ishikawa | 360/74.1 |
| 5,323,396 | 6/1994 | Lokhoff | 370/94.1 |
| 5,592,342 | 1/1997 | Hall et al. | 360/72.2 |

FOREIGN PATENT DOCUMENTS

0402973A1 12/1990 European Pat. Off.
0448160A1 9/1991 European Pat. Off.

*Primary Examiner*—Aristotelis M. Psitos
*Assistant Examiner*—Alan Faber
*Attorney, Agent, or Firm*—Michael E. Belk

[57] ABSTRACT

In a multitrack recording arrangement in which information may be recorded in or reproduced from a plurality of adjacent tracks simultaneously and in which the plurality of adjacent tracks are longitudinally partitioned into segments referred to as tape frames, each tape frame being formed of a plurality of laterally adjacent track segments referred to as track frames, each tape frame is assigned to one of a plurality of channels, one channel of information being recorded in each n-th tape frame.

20 Claims, 3 Drawing Sheets

MULTITRACK RECORDING ARRANGEMENT IN WHICH TAPE FRAMES FORMED OF LATERALLY ADJACENT TRACK FRAMES ARE DISTRIBUTED AMONG RECORDING CHANNELS

BACKGROUND OF THE INVENTION

The invention relates to a multitrack recording arrangement for recording at least a first and a second information signal in a plurality of longitudinal tracks located on a longitudinal record carrier, having an input for receiving said information signals, channel encoding means for carrying out a channel encoding step on the information signal, recording means for recording the channel encoded information signal, the tracks having track frames of information recorded in it, subsequent track frames in a track being divided by interframe gaps, neighbouring track flames in the plurality of tracks being of substantially the same length and forming a tape frame of information, and neighbouring interframe gaps in the plurality of tracks being of substantially the same length. The invention also relates to a multitrack reproducing arrangement for reproducing from a record carrier, the information recorded on said record carrier by the recording arrangement, and to a record carrier.

The recording arrangement as defined in the opening paragraph, which is further provided with datareducing means for carrying out a data reduction step on the information signals to be recorded prior to channel encoding, is known in the form of a recording arrangement of the well known DCC type. A stereo audio signal, comprising a left and right hand signal component, is digitized, a precision adaptive subband coding (PASC) is carried out on each of the signal components so as to obtain datareduced left and right hand signal components, the datareduced signal components are combined into one datastream that satisfies the format specified in EP-A 402.973, to which U.S. Pat. No. 5,323,396 corresponds. Next a channel encoding step is carried out on the serial datastream of the combined datareduced signal components. This channel encoding step comprises an error correction encoding step and a channel modulation step, such as an 8-to-10 modulation. An 8-to-10 modulation has been described extensively in U.S. Pat. No. 4,620,311.

The channel encoded signal thus obtained is recorded on a sector, such as the A-sector, of the record carrier. More specifically, the channel encoded signal is recorded in 8 tracks running longitudinally side-by-side along the record carrier on the A-sector of the record carrier.

The B-sector likewise has 8 tracks running in the longitudinal direction of the record carrier, in which a channel encoded signal is recorded. The direction of transport of the record carrier during recording on the A-sector is contrary to the direction of the transport of the record carrier during recording on the B-sector.

Recording the channel encoded signal in the 8 tracks on a sector is realized by filling neighbouring track frames in the 8 tracks. The neighbouring track frames in the 8 tracks are of substantially the same length and in each track subsequent track frames are separated by an interframe gap. Regarding the interframe gaps, reference is made to EPA 448,160, to which U.S. Pat. No. 5,267,098 corresponds. Also neighbouring interframe gaps have substantially the same length. The 8 neighbouring track frames in the 8 tracks form a tape frame.

SUMMARY OF THE INVENTION

The invention has for its object to provide a multi-track recording arrangement, which enables the editing of one or more of the signals recorded.

The recording arrangement in accordance with the invention is characterized in that the recording arrangement is adapted record n channel encoded information signals in n subsequent tape frames in said plurality of longitudinal tracks, such that information belonging to one channel encoded information signal is recorded in each n-th tape frame, and that $n \geq 2$.

The invention is based on the following recognition. In the prior art reproducing apparatus, the information relating to the original left and right hand signal components is both included in the information stored in each tape frame. Re-recording the left hand signal component alone is thus not possible and results in a deletion of the original right hand signal component recorded earlier.

In accordance with the invention, one information signal is recorded in a tape frame and two subsequent tape frames comprise information belonging to different information signals. As a result, editing is now realizable by recording, in an edit mode, an information signal in each n-th tape frame and leaving the information in the other tape frames unchanged.

An error correction encoding can now be carried out on blocks of information that will be included in one tape frame after having carried out the channel encoding step. Upon reproduction, if one track is missing, because of the fact that the one head in the reproducing head arrangement that reads the said track does not function properly, the error correction carried out in the channel decoding step upon reproduction may be capable of correcting for the missing track, so that the information signal can be regenerated. This is an advantage over a solution where one information signal would have been recorded in one track only. In such a situation, it is not possible to regenerate the said information signal from the record carrier upon reproduction.

Preferred embodiments of the recording arrangement are the subject of the sub claims 2 to 10.

BRIEF DESCRIPTION OF THE DRAWINGS

These and other aspects of the invention will be further elucidated in conjunction with the following figures, in which.

DESCRIPTION OF THE PREFERRED EMBODIMENTS

Figure 1:
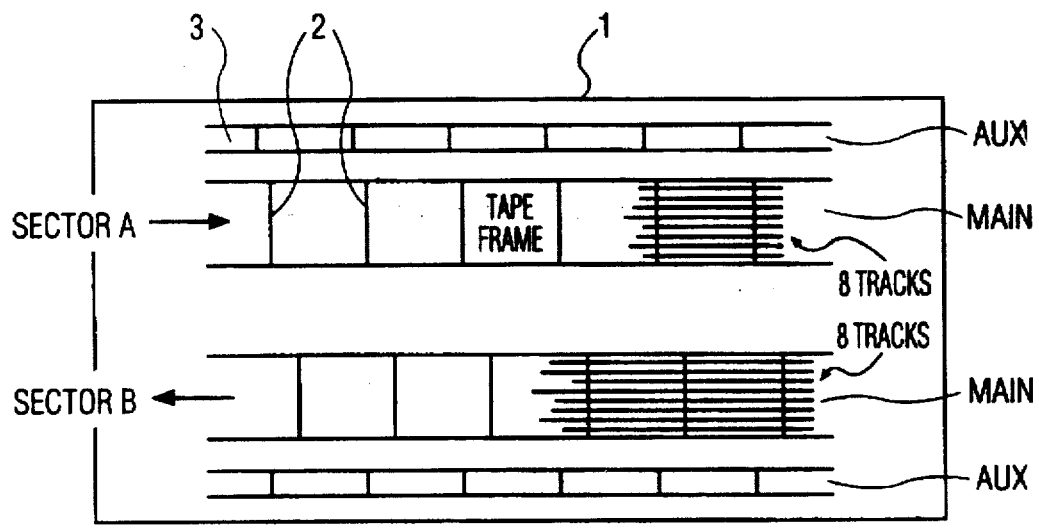
FIG. 1 shows the conventional DCC tape format.

FIG. 1 shows schematically the format of the record carrier of the DCC type. On each sector A and B of the record carrier 1 a plurality of 8 tracks (also called the 'main' data tracks) are located in which the channel encoded datareduced left and right hand signal components of the stereo audio signal are recorded. Further, one auxiliary track is located nearest the edge of the record carrier in which auxiliary information is recorded. The 8 tracks in the main data track area comprise track frames divided by interframe gaps. The interframe gaps are schematically indicated by the lines having the reference numerals 2. Neighbouring track frames in the 8 tracks have substantially the same length. Neighbouring interframe gaps in the 8 tracks also have substantially the same length. The neighbouring track frames in the 8 tracks form a tape frame. Reference is made to various publications, patents and patent applications that extensively describe the DCC system.

The DCC system is developed by the N. V. Philips' Gloeilampenfabrieken and is based on two subsystems: the PASC (precision adaptive subband coding) audio coding subsystem and the tape recording and reproduction subsystem.

The PASC audio coding subsystem enables high quality stereo audio to be recorded at a rate of 384 kbits/sec. It is related to the ISO/MPEG-level 1 audio coding. The current PASC IC's have—as an undocumented feature—the ability to reduce the data rate to some lower bit rates as well. However, the resulting audio quality is greatly reduced if a bit rate lower than 256 kbits/sec is used. Unfortunately they do not support encoding of a single mono channel.

The tape recording and reproduction subsystem provides a transmission channel to the PASC codec. This channel normally operates at 384 kbits/sec in DCC, with 2 additional channels of about 6 kbits/sec. One of the additional channels is the 'system information channel' which is included in the information recorded in the 'main data area' on the record carrier 1, and has the same protection against errors as the main channel. The other additional channel is called the 'auxiliary channel', which is recorded in the auxiliary track 3 and is a bit more prone to drop outs, etc. Information in the tape recording subsystem is recorded in tape frames. The main channel tape frame size is 8192 bytes.

The DCC system can be adapted to serve as a technology base for a multitrack recording and reproducing system for recording/reproducing a multiplicity of information signals.

Such multitrack recording and reproducing system may need a higher data rate than 384 kbits/sec. To exploit as much as possible the advantages of the DCC system, the new tape drive system should be based on the key components developed for DCC. This has led to a tape drive that may be capable of operating at a tape speed of up to twice that of DCC, while being capable of accessing both sectors (=sides) of the DCC tape simultaneously. This gives the system a maximum throughput of 1536 kbits/sec. In most cases it will be best to divide this in 2 bit rates of 768 kbits/sec, so that both sectors can be handled separately.

Within these limits it is—in principle—possible to define as much 'streams' as needed, provided the total bit rate of the streams does not exceed the 768 kbits/sec per sector. E.g. it is possible to record 2 streams (or information signals) of 384 kbits/sec., or 4 of 192 kbits/sec on a sector. These figures apply to the maximum tape speed of 9.52 cm/sec. Lower tape speeds will reduce the throughput, but playing time will increase.

Figure 2:
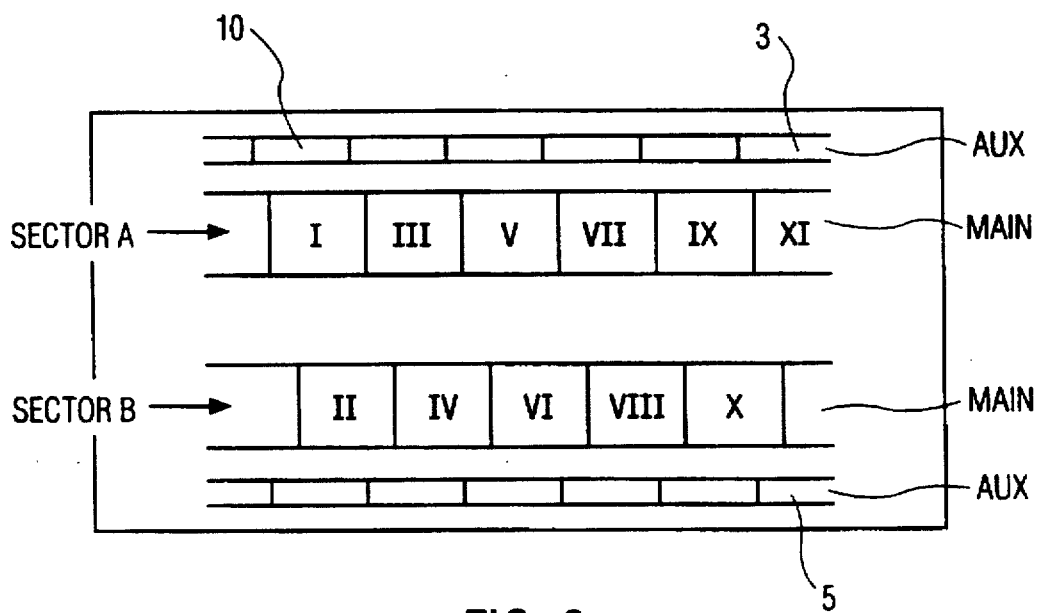
FIG. 2 shows an embodiment of the multi stream format.

The information signals will be recorded in time multiplex: e.g. if the recording arrangement is capable of recording 3 information signals per sector, every 3rd tape frame will contain the information for the same information signal. As such, a limited number of information signals can be recorded, provided the maximum intermediate storage memory is not infinitely available. FIG. 2 shows the tape format of the record carrier having a multiplicity of information signals recorded on it. The tape frames are denoted I, II, III, IV, V, VI, VII, VIII, IX, X and XI.

If the arrangement is capable of recording two information signals separately on the A-sector, information corresponding to one of the two information signals will be recorded in the tape flames I, V, IX, . . . etc, and information corresponding to the other of the two information signals will be recorded in the tape frames III, VII, XI, . . . etc. If the arrangement is capable of recording three information signals separately on the A-sector, information corresponding to the first one of the three information signals will be recorded in the tape frames I, VII, . . . etc, information corresponding to the second one of the three information signals will be recorded in the tape frames III, IX, . . . etc. and information corresponding to the third information signal will be recorded in the tape frames V, XI, . . . etc. An equivalent explanation is valid for the recording of two or more information signals on the B-sector.

Further, it may be necessary to record an identification information signal on the record carrier. Such identification information signal identifies which one of the information signals is recorded in a specific tape frame. As an example, assume that four information signals are recorded on a sector, such as sector A. The identification information signal could be a two bit digital number. The identification signals for the first to fourth information signal could be taken equal to '00', '01', '10' and '11' respectively. Assuming that information corresponding to the first information signal has been stored in the tape frames I and IX, the identification signal '00' can be stored in the tape frame I alone, assuming tape frame is the first frame having the information corresponding to the first information signal recorded in it, or in all tape frames I, IX, . . . etc which have information corresponding to the first information signal recorded in them. The identification signal '00' could be included in the information corresponding to the 'system information' channel which is recorded in the tape frame I, and others. Another possibility is to include the identification information in the auxiliary channel. In this situation, the identification signal '00' can be recorded in the track frame 10 in the auxiliary track 3, which track frame 10 is located adjacent the tape frame I. In this way, all the identification signals indicating the information signal recorded in a tape frame can be recorded in the track frame of the auxiliary track which is located adjacent said tape frame.

Figure 3:
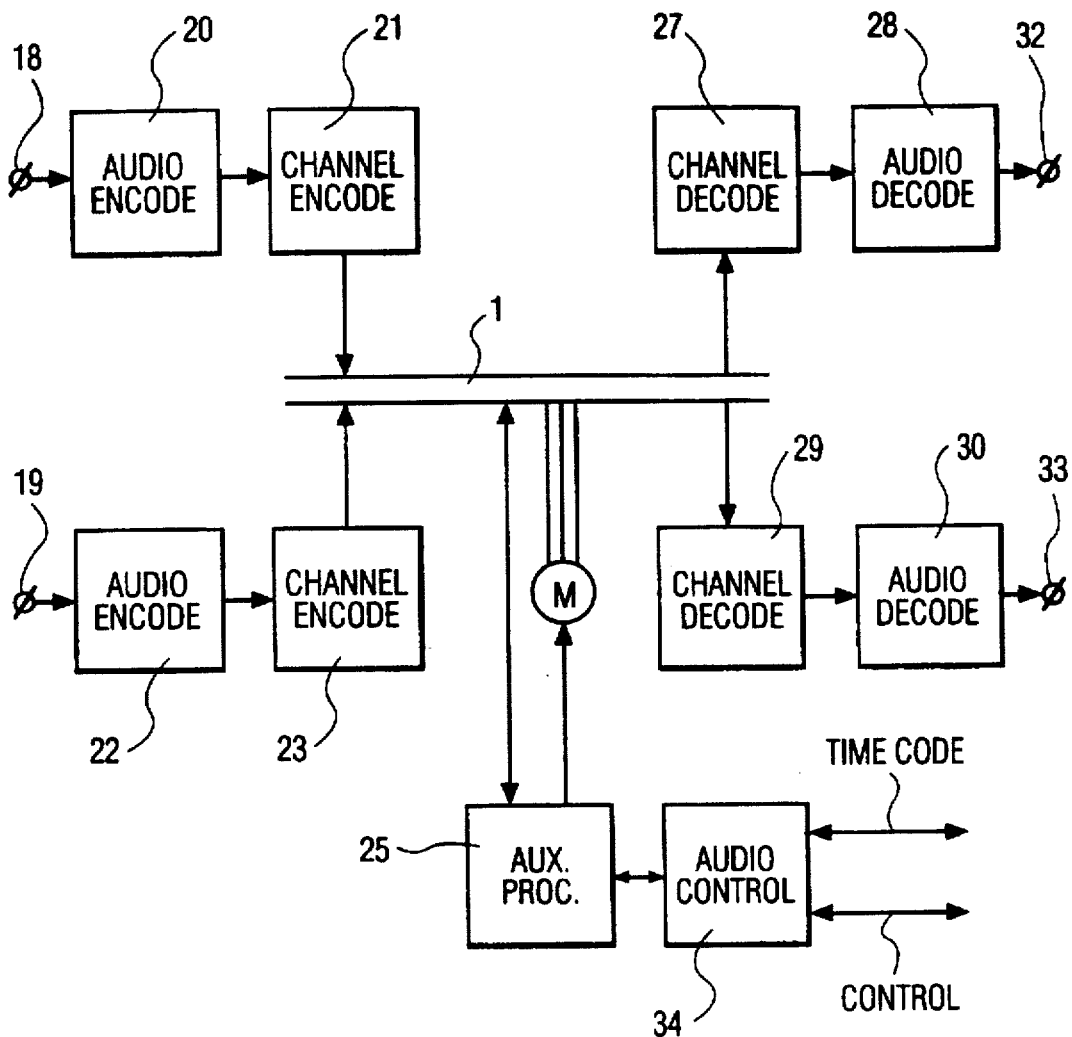
FIG. 3 shows an embodiment of a multi stream recorder/reproducer.

FIG. 3 shows a schematic block diagram of the recording and reproducing arrangement in accordance with the invention. The signal path comprising the audio encoding block 20 and the channel encoding block 21 realize the signal processing on the information signals supplied to the input terminal 18, that will be recorded on the A-sector. In the same way, the signal path from the input terminal 19 and comprising the audio encoding block 22 and the channel encoding block 23 realize the signal processing on the infomation signals supplied to the terminal 19, that will be recorded on the B-sector. The audio encoding block 20 and 22 carry out the PASC encoding step on the infomation signals, if such datareduction step is necessary, as will be made clear later. The channel encoding block 21 and 23 carry out an error correction encoding and a channel modulation, such as an 8-to-10 modulation on the encoded signal supplied by the blocks 20 and 22 respectively. Next the channel encoded information supplied by the block 21 is recorded in the tracks on the A-sector of the record carrier 1 and the channel encoded infomation supplied by the block 23 is recorded in the tracks on the B-sector.

Auxiliary information is generated by the auxiliary signal generator block and is recorded in the two auxiliary tracks 3 and 5, see FIG. 2, located along the edges of the record carrier 1.

Upon reproduction, the information recorded in the tracks on the A-sector is read out and supplied to a channel decoding block 27, which carries out a channel demodulation step, such as a 10-to-8 demodulation, and an error correction step on the information read from the A-sector.

The signal thus obtained is a replica of the datareduced signal generated by the audio encoding block 20. This replica is supplied to an audio decoding block 28 which carries out a data expansion on the datareduced information so as to regenerate the original information signals and to supply the regenerated information signals to the output terminal 32.

The information recorded in the tracks on the B-sector is read out and supplied to a channel decoding block 29, which carries out a channel demodulation step, such as a 10-to-8 demodulation, and an error correction step on the information read from the B-sector. The signal thus obtained is a replica of the datareduced signal generated by the audio encoding block 22. This replica is supplied to an audio decoding block 30 which carries out a data expansion on the datareduced information so as to regenerate the original information signals and to supply the regenerated information signals to the output terminal 33.

Figure 4:
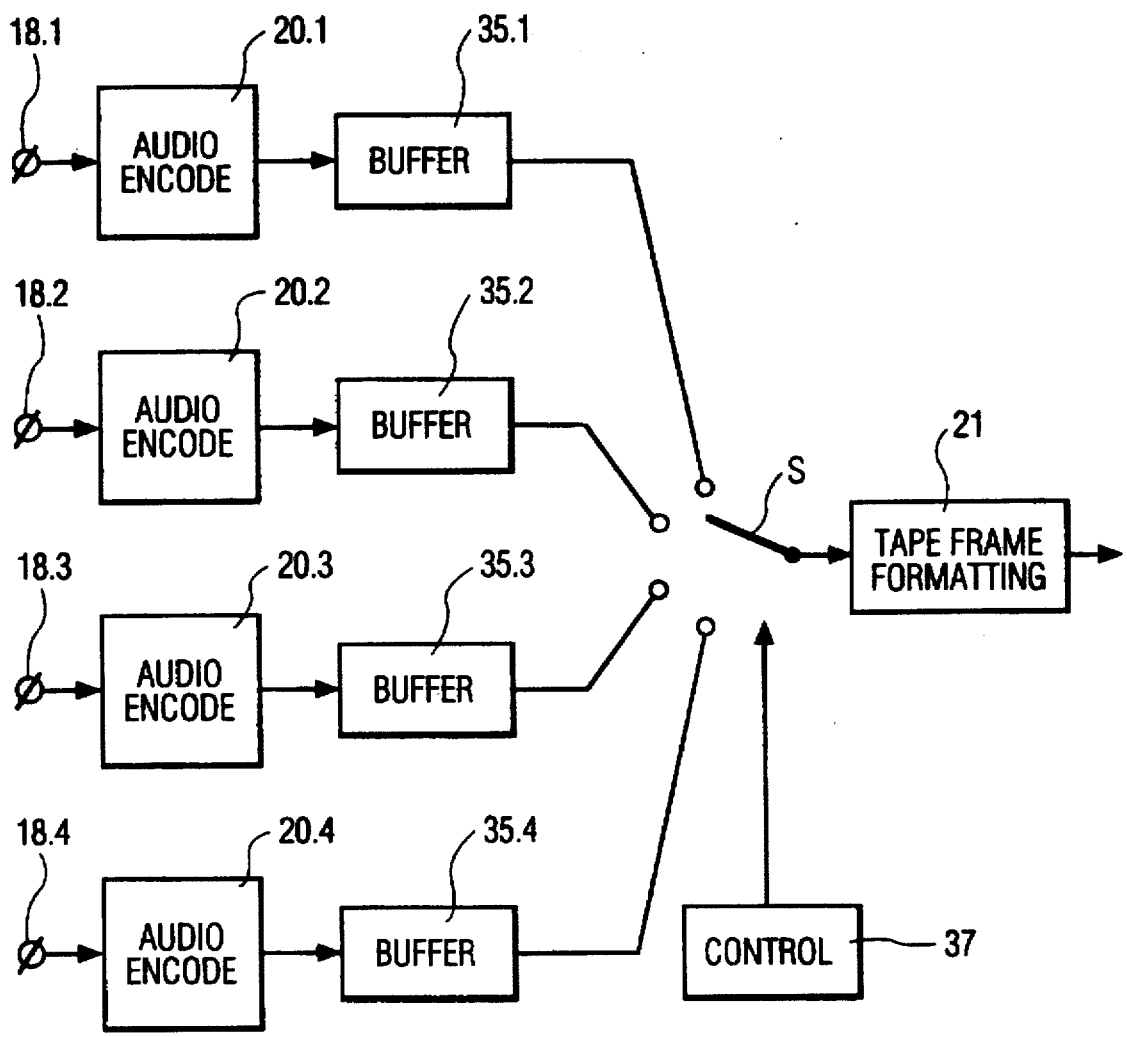
FIG. 4 shows the time multiplexing step prior to channel encoding (tape frame formatting).

FIG. 4 shows the multiplexing of the various information signals prior to channel encoding, assuming the recording device is capable of recording 4 information signals on the A-sector of the record carrier 1. Each of the four information signals can be applied to a respective one of the four input terminals 18.1 to 18.4 respectively. The audio encoding step is carried out on each of the signals separately by audio encoding blocks 20.1 to 20.4 respectively. Buffers 35.1 to 35.4 are available for temporarily storing the encoded information signals. Outputs of the buffers are coupled to terminals of a switch S. A fixed terminal of the switch S is coupled to the channel encoding block 21. In response to a switching control signal supplied by a control unit 37, the switch is in the position as shown in the figure. Information stored in the buffer 35.1 is now fed to the channel encoding block 21 and is channel encoded so as to obtain the information that precisely fits in the 8 neighbouring track frames that form a tape frame, such as the tape frame I in FIG. 2. During this recording of information so as to record the tape frame I, the audio encoding on the four signal continues so that encoded information is stored in the four buffers 35.1 to 35.4. After having completed the recording of the tape frame I, the switch S switches to the second position, so that the information stored in the buffer 35.2 can be supplied to the channel encoding block 21. The information from the buffer 35.2 is channel encoded and recorded on the record carrier so as to obtain the tape frame III. After having completed the recording of the tape frame II, the switch S switches to the third position, so that the information stored in the buffer 35.3 can be supplied to the channel encoding block 21. The information from the buffer 35.3 is channel encoded and recorded on the record carrier so as to obtain the tape frame V. After having completed the recording of the tape frame V, the switch S switches to the fourth position, so that the information stored in the buffer 35.4 can be supplied to the channel encoding block 21. The information from the buffer 35.4 is channel encoded and recorded on the record carrier so as to obtain the tape frame VII. Next, the switch switches again into the position as shown in the figure and the steps described above are repeated, resulting in the formation of the tape frames IX, XI, . . . etc. The identification signal explained above can be generated in the auxiliary signal generator 25, see FIG. 3, and be recorded in the auxiliary track 3.

It will be appreciated that an equivalent explanation is valid for the functioning of the audio encoding block 22.

In the same way, the reproduction path will be an 'inverse version' of the recording path described above. It will be appreciated that, where the identification signal explained above is recorded on the record carrier, that the reproducing arrangement comprises means for detecting the identification signal. In the example given above, where the recording arrangement was capable of recording 4 information signals in the sector A, the reproducing arrangement will retrieve, in response to the 2-bit word identification signal the information corresponding to the first information signal from the tape frames I, IX, . . . etc, the information corresponding to the second information signal from the tape frames III, XI, . . . etc, the information corresponding to the third information signal from the tape frames V, . . . etc and the information corresponding to the fourth information signal from the tape frames VII, . . . etc.

An SMPTE time code can be introduced in the auxiliary track. As a result, no storage capacity in the main data tracks will have to be sacrificed. The SMPTE time code can be generated internally or received from an external source, and can be supplied via a system control block 34 to the auxiliary signal processing block 25, see FIG. 3.

The number of information signals that can be recorded is limited by the coding delays in the system: if someone has recorded some information signals and wants to add another one in parallel, while listening to the audio in the original ones, the decoding delays will play an important role on where the information can be stored. The original information signal recorded earlier will have to be read from tape and error corrected, next the audio decoder will have to operate on it. The new audio will have to be encoded, and finally the tape drive system will have to add the error correction encoding infomation. The total process takes several hundredths of milliseconds, in which the tape has travelled several millimeters. Any design in which such features ('sound on sound') are to be incorporated, will have to take this into consideration.

Various applications and deviations of the arrangement described above are possible.

It may be advantageous to apply the two sectors A and B as separate 'session' storages: a recording made on the tracks of sector A can be played back, while the information read out is mixed with new content and recorded on sector B. Now the total programme content will shift, but no time correction is necessary during playback of the new programme.

In an editing mode, it is in principle possible to re-record an individual information signal. This should enable editing of individual audio channels. Dependent of the head configuration, it may not be possible to record and playback the same information signal at the same moment, such as in the situation where a single head is present for recording and reproduction. Read-after-write with such a head configuration is thus not possible.

The auxiliary track may be used to provide tracking information during re-recording of one or more of the information signals.

MIDI signals may be recorded as one or more of the information signals, provided the bit rate is sufficiently high enough.

In the DCC system, the ITTS text information is recorded in the 'system information channel' that is also recorded in the main data area. On the multitrack recording arrangement in accordance with the present invention, this could be applied as well. However, the text information has to be recorded at the same instance the audio information is recorded. Therefore the text needs to be available in the recording arrangement before making the audio recording. It can include topics such as recording date, artists, place of recording etc. Control information could be recorded as well, see FIG. 3.

The playing time of a cassette depends on the choices made with regard to tape speed, bit rate and sector usage. With the DCC format a D105 cassette plays for 105 minutes. Using both sectors in parallel at nominal speed, this means that the playing time will be reduced to 52½ minutes. Increasing the tape speed will reduce this even more, to a minimum of 26¼ minutes using both sectors in parallel at double speed.

The tape drive system as described above will provide a number of information signals at a certain bit rate. For a multitrack recording arrangement in accordance with the invention, each of these information signals will carry one—or depending on the application perhaps two—mono audio channels. The level of independence of the information signals defines the complexity of the hardware applied. With limited hardware in the tape drive unit, the information signals of a single sector will all have to be recorded at the same time. A more complicated design will allow separate updating of an information signal recorded in a sector (an initial recording on 'virgin tape' will always have to record all tape frames of a sector).

The choice of audio coding system depends on the quality level, the available bit rate per stream, the number of independent audio channels and the features required. It may be possible to apply the PASC IC's. Compared to DSPs (digital signal processors) they are an economical solution. However, they are also less flexible: encoding of a single mono signal is not supported. It may be possible to add a small device that transcodes the output of the PASC encoder into a kind of 'pseudo mono' signal, or have the ROM of the IC's changed to include mono mode.

In addition the number of bit rates supported is low. These IC's could probably be used for a recorder that is capable of recording 2 dependent 'stereo' audio channels per sector (in total 4 times a 'stereo' channel).

DSPs will allow a number of audio coding systems, but are more expensive and may require elaborate software development. With these it is possible to encode with e.g. the ISO/MPEG level 2 coding scheme, which will provide better quality at lower bit rates. But other schemes are possible as well.

The basic difference between MPEG 1 and 2 audio coding is the 'granularity' of the coding frames: level 1 uses a code frame of 8 msec., level 2 of 24 msec. (at 48 kHz sampling frequency). As such, level 1 may be more suited for editing at coded level, but level 2 can achieve better quality at lower bit rates. It is for this reason that most applications in the broadcasting environment apply level 2 coding.

It may even be possible to extend the playing time to twice that of the current proposal by increasing the bit density on the tape. For this the track pitch should be halved, allowing the recording of a new set of tracks in reverse direction in between the forward tracks. In this situation, a new head assembly needs to be developed, with reduced heights for the recording heads.

It should be noted that, although the invention has been extensively described using an embodiment of the recording arrangement that is further provided with datareducing means for carrying out a data reduction step on the information signals prior to channel encoding, such datareduction step is not essential for the invention.

The invention is equally well applicable in recording arrangements for recording a multiplicity of data information signals with a bitrate (much) lower than the bitrate of wideband digital audio signals, and where a datareduction step is thus not necessary.

Further, it should be made clear that the number of information signals that can be recorded on one sector is not necessarily restricted to 4. This amongst others depends on the tape speed, as a higher tape speed may enable more information signals to be recorded. Increasing the number of information signals to be recorded on a sector may however mean an enlargement of the buffer size.

I claim:

1. Multitrack recording arrangement for recording at least a first and a second information signal in a plurality of longitudinal tracks located on a longitudinal record carrier, said recording arrangement having an input for receiving said information signals, channel encoding means connected to said input for channel encoding each received information signal, recording means connected to said channel encoding means for recording the channel encoded information signal into a group of adjacent tracks, the adjacent tracks each being partitioned into successive track frames separated each from another by an interframe gap, information being recorded in each track frame, laterally adjacent track frames in the group of adjacent tracks having substantially the same length and being longitudinally aligned relative to each other to form a tape frame, laterally adjacent interframe gaps in the group of adjacent tracks also having substantially the same length, wherein the recording arrangement time multiplexes n channels of encoded information signals for recording in n successive tape frames in said plurality of longitudinal tracks such that information belonging to only one channel encoded information signal is recorded in each tape frame and the information belonging to any particular single channel, and only said single channel, is recorded in each n-th tape frame, and that n≧2.

2. Multitrack recording arrangement as claimed in claim 1, for recording said at least first and second information signal in said plurality of longitudinal tracks, said plurality of longitudinal tracks being located on an A-sector of the record carrier, and for recording at least a third and a fourth information signal in a second plurality of longitudinal tracks located on a B-sector of the record carrier, the tracks on the B-sector each being partitioned into successive track frames separated each from another by an interframe gap, information being recorded in each track frame, laterally adjacent track frames in the second plurality of tracks having substantially the same length and being longitudinally aligned with respect to each other to form a tape frame, laterally adjacent interframe gaps in the second plurality of tracks also having substantially the same length, wherein the recording arrangement time multiplexes m channels of information signals for recording in m successive tape frames in said second plurality of longitudinal tracks on said B-sector such that information belonging to only one channel of information signals is recorded in each tape frame of the second plurality of tracks and the information signals belonging to any particular single channel, and only said single channel, is recorded in each m-th tape frame, and that m≧2.

3. Multitrack recording arrangement as claimed in claim 2, characterized in that, n=m.

4. Multitrack recording arrangement as claimed in claim 2, characterized in that, the recording arrangement is adapted to record the n+m information signals in the tracks On said A- and B-sectors, the direction of transport of the record carrier being the same for the recording of the n information signals in the tracks on the A-sector and for the recording of the m information signals in the tracks on the B-sector.

5. Multitrack recording arrangement as claimed in claim 2, characterized in that, the length of the tape frames on the A-sector and the B-sector are substantially equal, and the location of the tape frames on the A-sector do not coincide with the location of the tape frames on the B-sector.

6. Multitrack recording arrangement as claimed in claim 5, characterized in that, the tape frames on the A-sector are shifted over substantially half their length relative to the tape frames on the B-sector.

7. Multitrack recording arrangement as claimed in claim 1, characterized in that, in an edit mode, the recording arrangement is adapted to record only one information signal on said record carrier in each n-th tape frame whilst leaving the information in the other tape frames unchanged.

8. Multitrack recording arrangement as claimed in claim 7, characterized in that identification information belonging to an information signal recorded is recorded on the record carrier, the said identification information indicating which of the tape frames comprise information corresponding to the said information signal.

9. Multitrack recording arrangement as claimed in claim 7, characterized in that the arrangement further comprises datareducing means for data reducing the information signals to be recorded prior to channel encoding of said information signals.

10. Multitrack recording arrangement as claimed in claim 1, characterized in that identification information belonging to an information signal recorded is recorded on the record carrier, the said identification information indicating which of the tape frames comprise information corresponding to the said information signal.

11. Multitrack recording arrangement as claimed in claim 8, characterized in that the identification information is recorded in an additional track located in parallel to the plurality of tracks on said record carrier.

12. Multitrack recording arrangement as claimed in claim 1, characterized in that the arrangement further comprises data reducing means for datareducing the information signals to be recorded prior to channel encoding of said information signals.

13. Multitrack reproducing arrangement for reproducing at least a first and a second information signal from a record carrier that has been obtained by the recording arrangement as claimed in claim 1.

14. Record carrier obtained with the recording arrangement as claimed in claim 1, characterized in that it comprises a plurality of tracks running side by side in the longitudinal direction of the record carrier, each of the plurality of tracks being partitioned into successive track frames separated each from another by an interframe gap, information being recorded in each track frame, laterally adjacent track frames in the plurality of tracks having substantially the same length and being longitudinally aligned relative to each other to form a tape frame, laterally adjacent interframe gaps in the plurality of tracks also having substantially the same length, that n channel encoded datareduced information signals are recorded in n successive tape frames in said plurality of longitudinal tracks, such that information belonging to only one channel encoded datareduced information signal is recorded in each tape frame and the information belonging to any particular single channel, and only said single channel, is recorded in each n-th tape frame, and that $n \geq 2$.

15. Record carrier as claimed in claim 14, characterized in that identification information belonging to an information signal recorded is recorded on the record carrier, the said identification information indicating which of the tape frames comprise information corresponding to the said information signal.

16. Record carrier as claimed in claim 15, characterized in that the identification information is recorded in an additional track located in parallel to the plurality of tracks on said record carrier.

17. Multitrack recording arrangement as claimed in claim 2, characterized in that identification information belonging to an information signal recorded is recorded on the record carrier, the said identification information indicating which of the tape frames comprise information corresponding to the said information signal.

18. Multitrack recording arrangement as claimed in claim 2, characterized in that the arrangement further comprises datareducing means for data reducing the information signals to be recorded prior to channel encoding of said information signals.

19. Multitrack reproducing arrangement for reproducing at least a first and a second information signal from a record carrier that has been obtained by the recording arrangement as claimed in claim 2.

20. Record carrier obtained with the recording arrangement as claimed in claim 2, characterized in that, it comprises a plurality of tracks running side by side in the longitudinal direction of the record carrier, each of the plurality of tracks having track frames of information recorded in it, subsequent track frames in a track being divided by interframe gaps, neighbouring track frames in the plurality of tracks being of substantially the same length and forming a tape frame of information, and neighbouring interframe gaps in the plurality of tracks being of substantially the same length, that n channel encoded datareduced information signals are recorded in n subsequent tape frames in said plurality of longitudinal tracks, such that information belonging to one channel encoded datareduced information signal is recorded in each n-th tape frame, and that $n \geq 2$.

* * * * *